No. 762,141. PATENTED JUNE 7, 1904.
N. A. CHRISTENSEN.
ELECTRIC MACHINE.
APPLICATION FILED APR. 8, 1901.
NO MODEL. 5 SHEETS—SHEET 2.
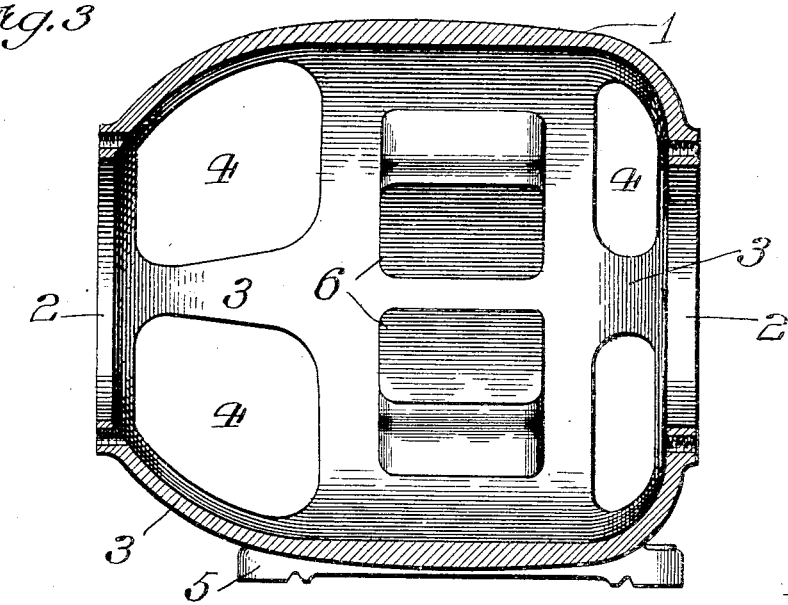
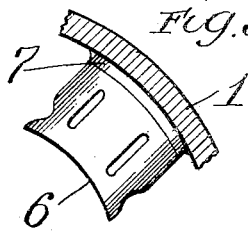
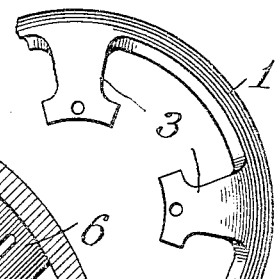
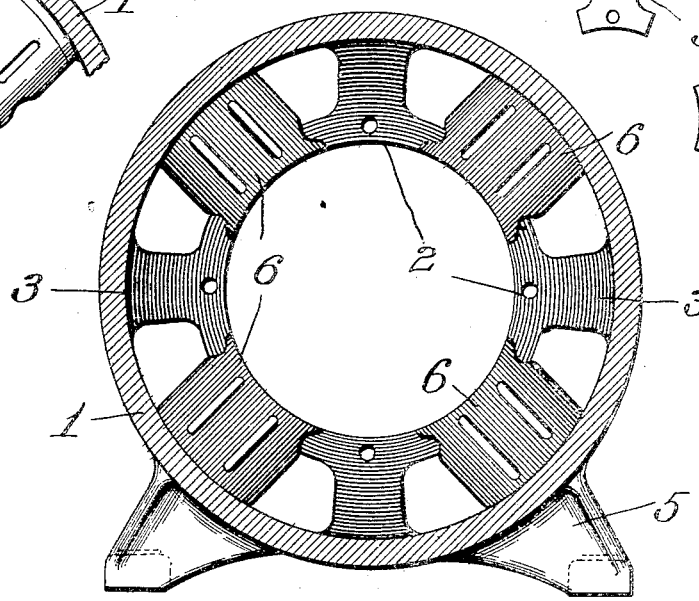
Witnesses:
Harold G. Barnett
Louis B. Erwin
Inventor:
Niels Anton Christensen
By Rector & Hibben
Attys

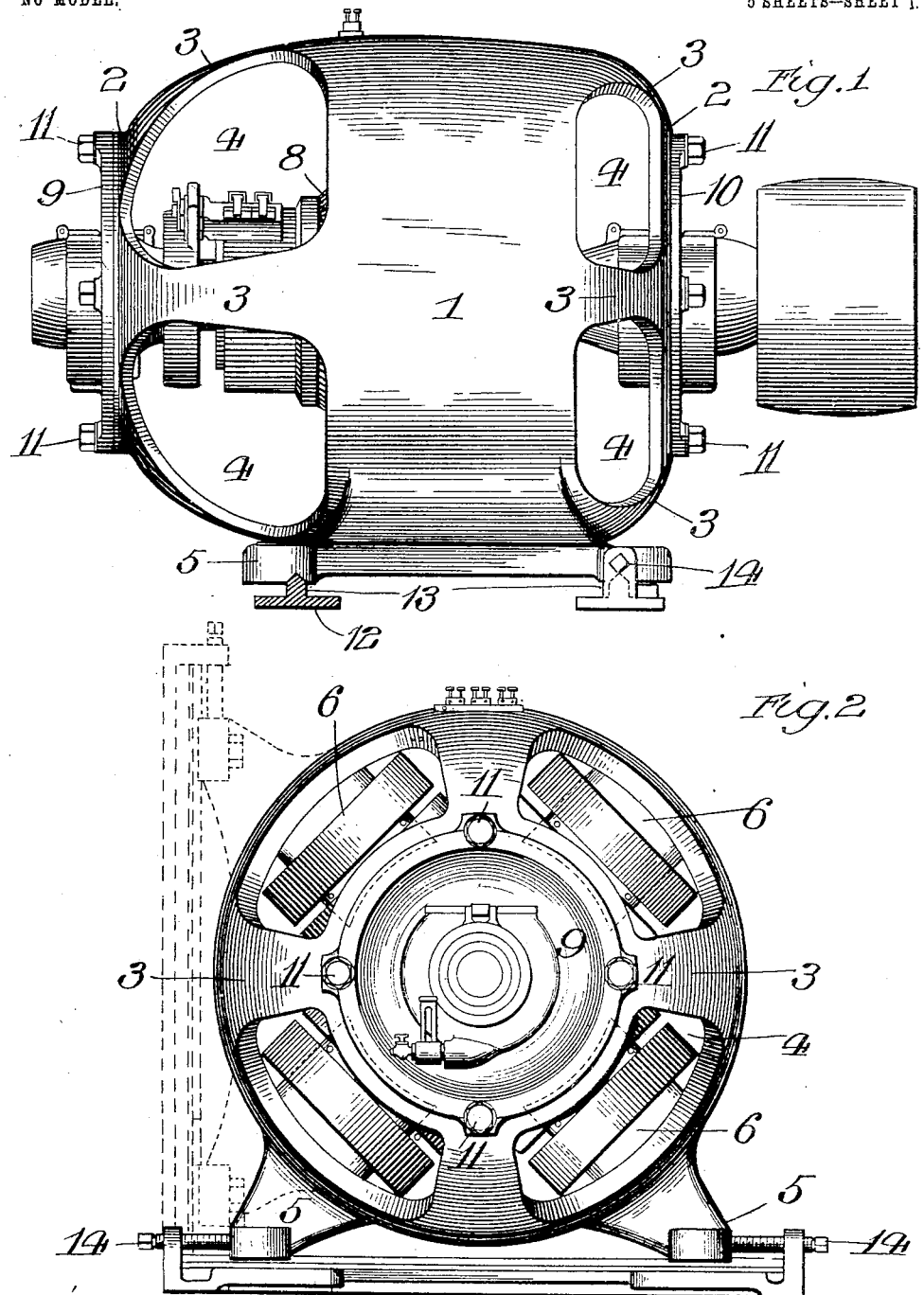

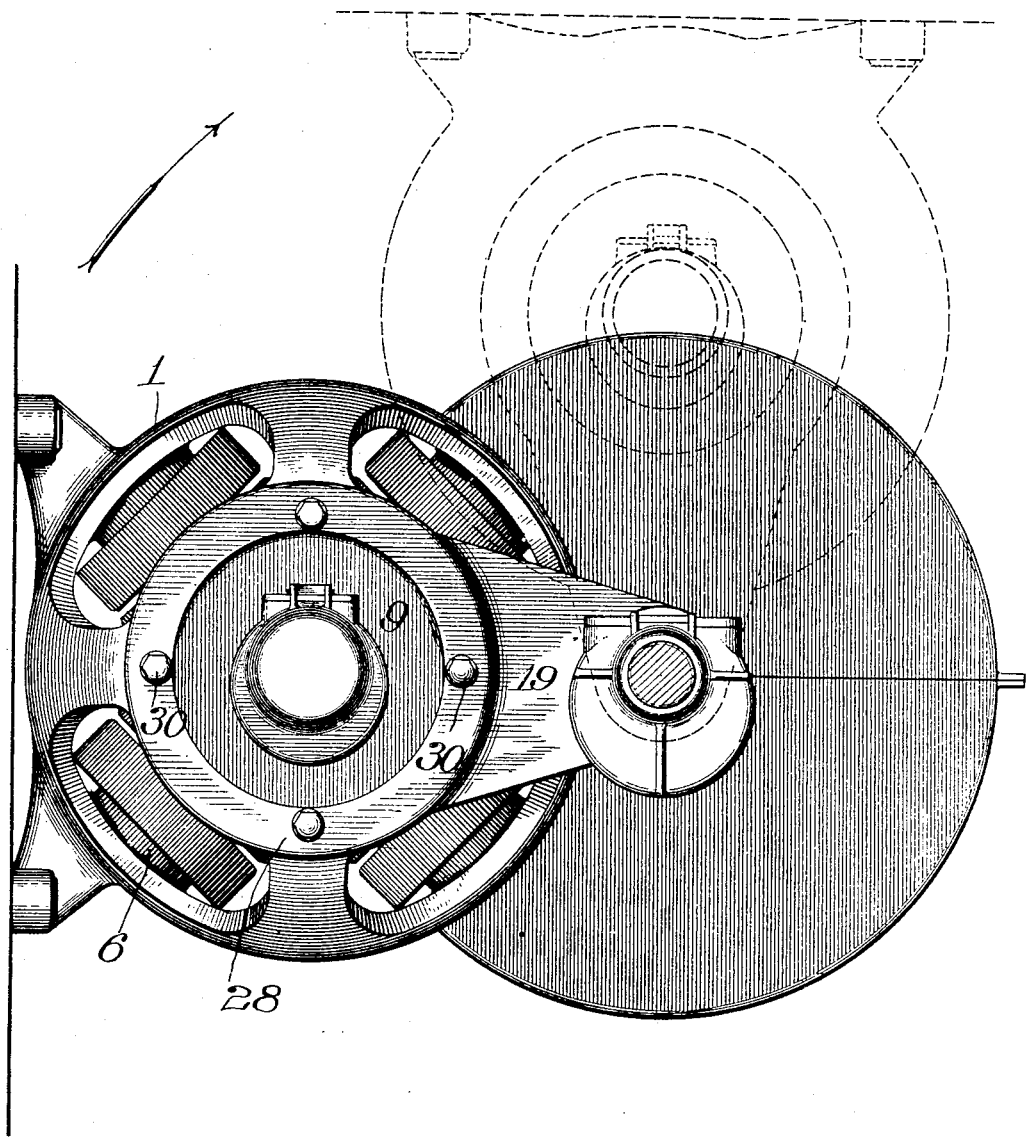

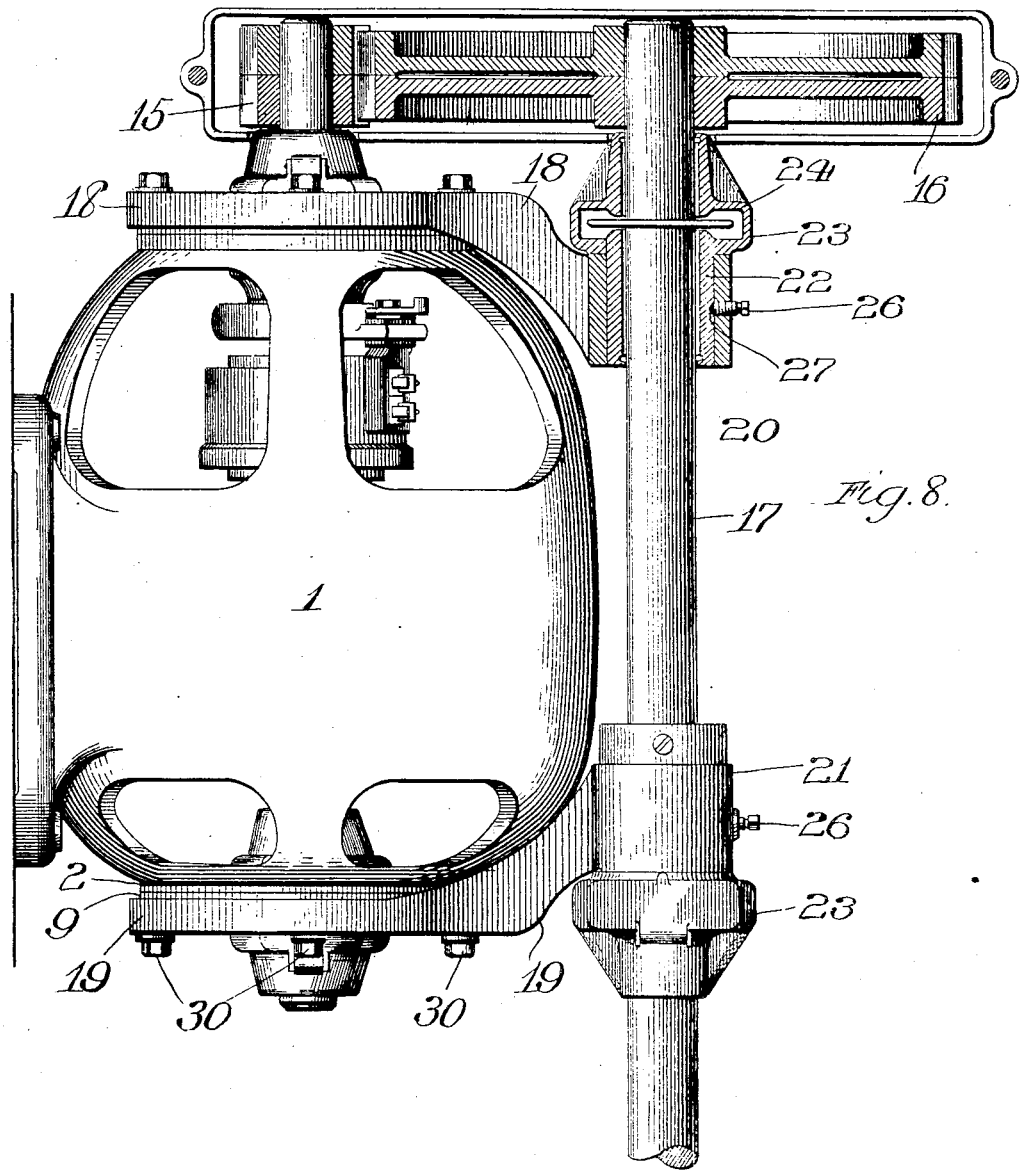

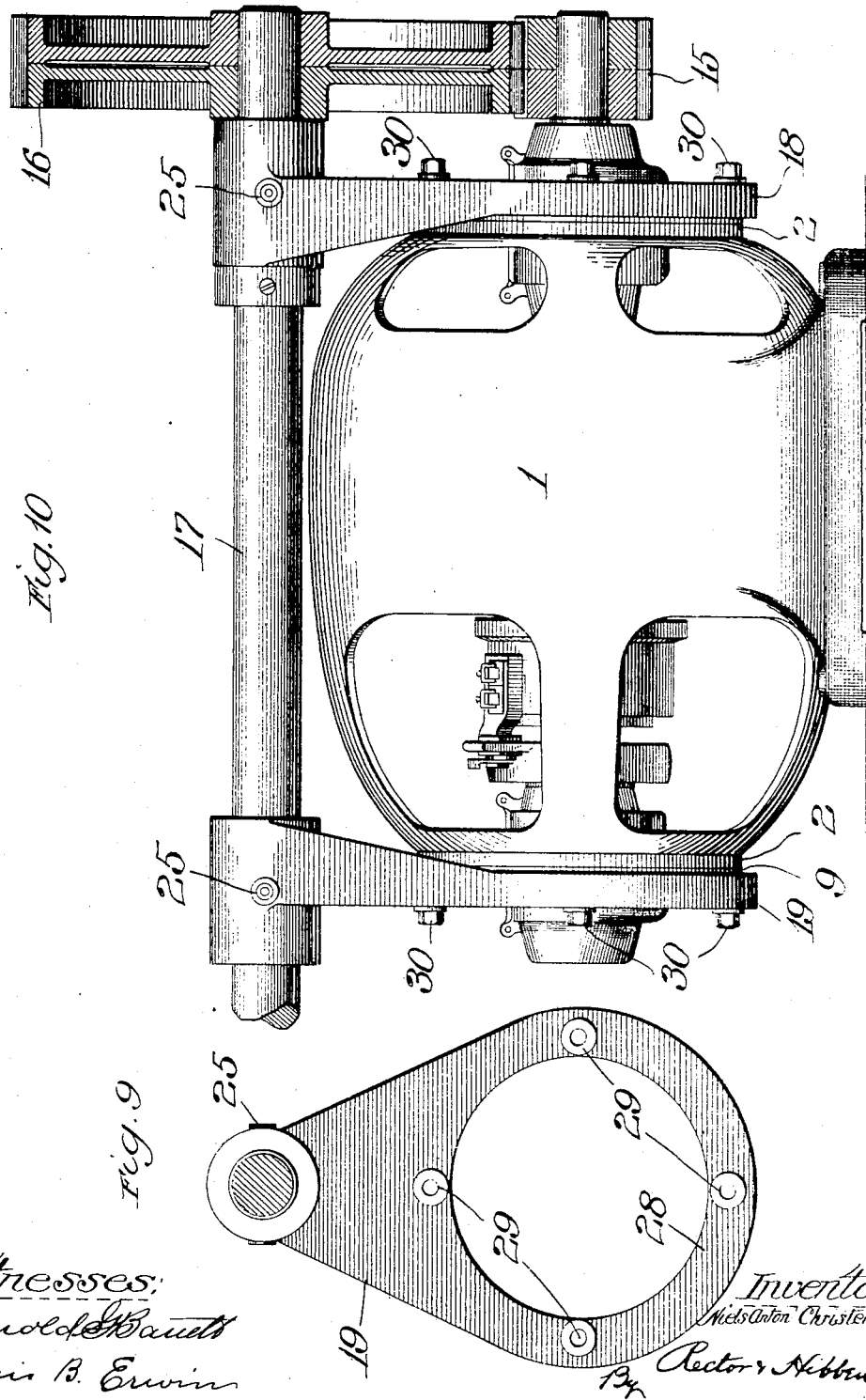

No. 762,141.

Patented June 7, 1904.

UNITED STATES PATENT OFFICE.

NIELS ANTON CHRISTENSEN, OF MILWAUKEE, WISCONSIN.

ELECTRIC MACHINE.

SPECIFICATION forming part of Letters Patent No. 762,141, dated June 7, 1904.

Application filed April 8, 1901. Serial No. 54,845. (No model.)

*To all whom it may concern:*

Be it known that I, NIELS ANTON CHRISTENSEN, residing at Milwaukee, Wisconsin, have invented certain new and useful Improvements in Electric Machines, of which the following is a specification.

My invention relates to electric machines generally, both to generators or dynamos and to electric motors, and pertains more particularly to a back-gearing device therefor which is made adjustable for the purpose of rendering the machine universal—that is, capable of use on the floor, ceiling, wall, or other support, or, in fact, capable of use at practically any angle, and also for the purpose of enabling the back-gear device or counter-shaft to be angularly shifted or adjusted with respect to the armature-shaft without disturbing the parallelism between the driving and driven shafts—that is to say, the counter-shaft may be swung or rotarily shifted and adjusted with respect to the armature-shaft, or the armature-shaft and, in fact, the entire machine may be swung or rotarily shifted and adjusted with respect to the counter-shaft. Furthermore, my invention also relates to oiling mechanism, which is made adjustable to compensate for the adjustment of one or the other of the shafts to different positions, as stated.

In the drawings, Figure 1 is a side elevation of an electric machine embodying my invention; Fig. 2, an end elevation showing a floor-machine in full lines and its position as a wall-machine in dotted lines; Fig. 3, a central longitudinal section of the machine-frame; Fig. 4, a transverse section on line A B of Fig. 3; Fig. 5, a section through a portion of a machine-frame, showing a body for a pole-piece; Fig. 6, an end view of the machine-frame, showing stub ends instead of the continuous ring; Fig. 7, an end elevation of a machine with my back-gearing arrangement in place thereon, the full lines showing the machine as used on the wall and the dotted lines as when used on the ceiling; Fig. 8, a side elevation of the electric machine and the back gearing, the back-gearing axle being provided with lubricating mechanism of the ring oiling type; Fig. 9, an elevation of one of the brackets for the back gearing, and Fig. 10 a side elevation of a motor with a modified form of back-gearing, in which the lubricating mechanism consists of ordinary grease-cups instead of the ring oiling arrangement.

Owing to the convertibility of dynamos and motors one into the other, my invention, while more particularly designed for electric motors, is obviously capable for embodiment in a dynamo. Consequently it will be understood that such invention is applicable to electric machines generally, both dynomos and motors.

As shown, the machine is a unitary structure, preferably of cast-steel, and comprises the main body or central portion 1, sometimes called the "field-piece," and end portions or rings 2, which are connected to the body by arms 3 and which have openings sufficiently large to permit the armature to pass through. The number of arms is dependent upon the number of holes 4, of which the desired number, more or less, may be provided. It is evident that the machine can be inclosed by simply covering the openings 4. The feet 5 are preferably cast integral with the frame. Also the pole-pieces 6 may be cast separate or integral with the frame, as may be desired. While the pole-pieces are herein shown as integral with the machine-frame, they are not necessarily so, but, in fact, may be formed separate and secured thereto in any suitable manner; but when the parts are thus cast together in a single structure the poles can be bored at the same time as the rings or ends of the frame and with one setting of the tools, whereby a self-alining structure is provided for the armature-bearings, as will be fully apparent from the description hereinafter given. The pole-pieces may have the same bore as the end rings and be bored out by the same tool; but of course in order to facilitate the machine-work it is possible to do this work with a separate cutting-tool for the pole-pieces and each end ring. Instead of being cast integral with the frame or field-piece the pole-pieces may be formed separately, as above suggested, and secured to pads 7, whose faces have been finished to receive their pole-pieces, as illustrated in Fig. 5. These pads can be finished or bored at the same time as the end rings, so that the circles or arcs will all be described from identically the same center or the same central axis.

The armature 8 may be of any usual and well-known structure, and its shaft is provided with bearings in the end covers or heads 9 and 10, which are bolted to the rings 2 and close the central openings in the ends of the frame, which openings are of a size to accommodate the armature, which is inserted through one end or the other when being put into position within the frame. The heads are secured to the rings by a series or a multiplicity of bolts 11, and when four bolts are used, as illustrated in the drawings, the machine can be arranged on the floor, ceiling, or wall by simply changing the position of the frame with respect to its heads, which remain in the same position, so that the oil boxes or wells are always in proper horizontal position. In case more than four bolts are used it is evident that additional angles may be secured, which might be required or found desirable in some cases. When four bolts are used, four angles can be obtained, and when eight bolts are used eight angles. The function of the end rings is to form a connection between the frame and heads 9 and 10, and while it is preferred that these rings should be continuous, as shown in Figs. 1 to 4, yet it is evident that these rings need not necessarily be continuous, but that the ends of the arms, of which any desired number may be used, may form stubs to which these heads may be bolted. This modification of construction is clearly illustrated in Fig. 6 of the drawings.

When the central portion or field-piece of the frame is formed separate from the rings or ends, as is commonly done, a joint is rendered necessary between the field-piece and rings. This makes large surfaces to finish and is for other reasons objectionable in manufacturing. Furthermore, when the parts are thus cast separate and bolted together it is difficult to bore the pole-pieces absolutely accurate with respect to the armature-bearings, which are formed in the heads or covers fitting in the ends of the frame. In my construction, however, the pole-pieces (or the pads therefor) and end rings can be bored with the same tools and with the same setting thereof, and the heads which carry the armature-bearings are easily fitted with accuracy on the end rings.

As shown in Figs. 1 and 2, when the machine is used as a floor-machine it may have a separate base-plate 12, provided with rails 13, whereby the entire machine is adjusted to and held in proper position by set-screws 14. This same frame is also capable of attachment to a wall or ceiling.

The machines illustrated in Figs. 7 to 10 are of the back-geared type and embody my novel construction and arrangement of back gearing applied to an electric machine of the construction already described. The back-gear device, Fig. 8, consists of a pinion 15, meshing with a large gear 16, both the gear and the pinion being preferably of the herring-bone type. The gear is secured to a shaft or back-gear axle 17, on which is arranged a pair of brackets 18 and 19. These brackets have sleeves 20 and 21 fitting over the tubular extension 22 of the bearings 23, which in the construction shown in Fig. 8 has the ring oiling arrangement 24, while Fig. 10 illustrates the use of ordinary grease-cups 25. In case the ring oiling arrangement is used on the back-gear axle, as shown in Fig. 8, it is necessary to have the oil-well horizontal to accommodate various positions of the machine, whether used on the floor, wall, or ceiling, and also to accommodate different positions to which the back-gearing device may be adjusted to meet conditions in actual practice, and for this purpose the bearings are set into the brackets, as above described, and held in position by means of set-screws 26. Each bearing is provided with a multiplicity of holes, two, four, or more, such as the holes 27, one of which on each bearing will always be used as a receptacle for the point of the set-screw, depending upon the position of the back-gear axle relative to the armature-axis. While this construction will be found satisfactory yet it is obvious that other mechanical expedients or equivalents to the same end may be adopted. The lower end of each bracket 18 and 19, Fig. 9, is in the form of a ring 28 and is provided with a series of bolt-holes 29, corresponding in number to the bolts 30, which hold the end covers 9 and 10 into the frame of the machine. These bolts, which may be made longer than the corresponding bolts illustrated in Figs. 1 and 4, where no back gearing is used, pass through both the bracket and end covers, and thereby serve to fasten both of them to the frame. It is evident that by simply removing these bolts and then shifting the back-gear axle to the desired angle with relation to the armature and finally replacing the bolts the position of the back-gear axle can be readily adjusted as desired. Thus the back-gear arrangement is capable of being adjusted with respect to the machine, either on top or on the sides thereof, and likewise the machine itself is capable of being arranged on the floor, ceiling, or wall with the back gearing adjusted to correspond in the change in the place of use of the machine. The back gearing is thus separated and independent of the machine-frame, but is secured thereto and capable of adjustment thereon, and the frame is adjustable with respect to its end plates and armature-bearings. Consequently the back gearing and the electric machine may be said to be universal.

Heretofore in back-geared machines the brackets were cast on the heads of the field-frame, and when a back-geared motor was required it had to be built with the special heads provided with these brackets. In my improved construction I can arrange a back gearing to any of my standard motors by simply adding the brackets 19 and providing longer cap-screws 30, together with pinion-gear, &c., the lugs at the bolt-hubs on head 9 being originally turned or finished, so as to bring the back-gearing bracket concentric with the armature-axis.

I claim—

1. An electric machine having a back-gearing device therefor adjustable in relation thereto and also having an end head independent of said device and provided with a bearing for the armature-shaft.

2. An electric machine having a back-gearing device adjustable angularly in relation thereto and also having a pair of end heads independent of said device and provided with bearings for the armature-shaft.

3. An electric machine having a back-gearing device therefor adjustable in relation thereto, and also having an end head provided with an independent adjustment.

4. An electric machine having a back-gearing device adjustable angularly in relation thereto and also having end heads provided with an angular adjustment independent of the back-gearing device.

5. An electric machine having angularly-adjustable end heads provided with bearings for the armature-shaft, in combination with a back-gearing device having an angular adjustment independent of the end heads.

6. An electric machine having a counter-shaft geared to its armature-shaft, means for angularly shifting said counter-shaft to different positions around said armature-shaft, and end heads independent of the counter-shaft and having bearings for the armature-shaft.

7. An electric machine having a frame provided with heads having bearings for the armature-shaft, lateral projections or brackets independent of the heads and adjustable on said frame, and a counter-shaft journaled in said projections.

8. An electric machine having a frame provided with end heads, fastening-bolts therefor spaced at equal distances apart, lateral projections or brackets independent of the heads and adjustable on said frame, and a counter-shaft journaled in said projections.

9. An electric machine having a frame provided with angularly-adjustable end heads having bearings for the armature-shaft, lateral projections or brackets adjustable on said frame but independently of said heads, and a counter-shaft journaled in said projections.

10. An electric machine having a frame provided with angularly-adjustable end heads provided with fastening-bolts spaced at equal distances apart, lateral projections or brackets independent of the heads and adjustable on said frame, bearings in the outer ends of said brackets, and a counter-shaft journaled in said projections.

11. An electric machine having a cylindrical magnet-frame, circular heads rotatable on the ends of said frame, armature-shaft bearings at the centers of said heads, lateral projections or brackets independent of the heads and adjustable angularly with respect to the armature-shaft, and a counter-shaft journaled in said projections.

12. An electric machine having angularly-adjustable end heads provided with bearings for the armature-shaft, in combination with a back-gearing device comprising brackets each having a ring portion arranged to be adjustably secured to the machine and having bearings for a counter-shaft arranged to be driven by the armature-shaft.

13. An electric machine having angularly-adjustable circular end heads provided with bearings for the armature-shaft, in combination with a back-gearing device comprising brackets each having a ring portion arranged to fit upon the margin of its respective end head and to be adjustably secured thereto, and a counter-shaft journaled in said brackets and having operative connection with the armature-shaft.

14. The combination of an electric machine, a back gear actuated by such machine, a back-gear axle, brackets each having bearings at one end for such axle and at the other end a ring portion and means for removably attaching such portion to said machine.

15. The combination of an electric machine having a frame with end plates or heads, a back-gearing device and brackets carrying the back-gearing device, said brackets and heads being independently adjustable.

16. The combination of an electric machine, a back gear actuated by such machine, a back-gear axle, brackets each having bearings at one end for such axle and at the other end a ring portion provided with a multiplicity of bolt-holes and bolts for attaching said ring portions to the machine.

17. The combination of an electric machine having end heads or covers bolted to its field-frame and carrying the armature-bearings, such frame being adjustable with respect to said plates, and a back-gear device operated by such machine and having brackets provided with portions adapted to be bolted to said plates and frame by the same bolts as hold the plates to the frame.

18. In a back-gear device for electric machines, the combination, with the machine-frame, of a counter-shaft, end heads secured to such frame and having bearings for the armature-shaft, brackets adjustably secured to said frame and having bearings for said counter-shaft, and adjustable oiling mechanism for the counter-shaft bearings.

19. In a back-gear device for electric machines the combination of a back-gear axle, brackets for such axle, bearings set in the brackets for the axle and having series of holes in circular line, and a set-screw passing through the brackets and adapted to be received by any one of said holes and hold the bracket and bearing in different adjusted positions.

20. In a back-gear device for electric machines the combination with the machine having end plates bolted to the machine-frame, of a back-gear axle, brackets having a sleeve portion at one end and a ring portion at the other end, bearings adjustably arranged in said sleeve portions, said ring portions being bolted to said frame with the same bolts as fasten the end plates and being adapted to be arranged in any desired position relative to the armature-axis.

21. The combination of an electric-machine frame cast in a single piece and comprising the body portion or field-piece and the end portions, heads attached to the ends of such frame and a back-gearing device adjustably mounted on said heads.

22. The combination of an electric-machine frame cast in a single piece and comprising the body portion or field-piece and the end portions, end heads attached to, but permitting adjustment of the said frame and a back-gearing device mounted on such heads, said gearing device and frame being independently adjustable.

23. In an electric machine the combination of an electric-machine frame and a back-gearing device actuated by said machine, said device and said frame being independently adjustable with respect to the armature-axis.

24. The combination of an electric-machine frame having end heads secured thereto, and a back-gearing device brackets carrying said device and adjustably mounted on said heads.

25. The combination of an electric-machine frame having adjustable end heads secured thereto and provided with armature-shaft bearings, a counter-shaft, brackets adjustably mounted on said heads and having bearings for the counter-shaft, and adjustable oil-wells for the counter-shaft bearings.

26. The combination of an electric-machine frame cast in a single piece and comprising the body portion or field-piece and the end portion, end heads attached to, but permitting adjustment of said frame, and a back-gearing device comprising a gear actuated by the machine, a shaft or axle for the gear, and brackets having bearings for such axle and mounted upon but adjustable with respect to, said end heads.

27. The combination of an electric-machine frame having end heads, a back-gearing device and a bracket for said device said bracket and said frame being independently adjustable with respect to said heads.

28. The combination of an electric-machine frame having end heads bolted thereto, a back-gearing device, brackets carrying such device and bolted to the said heads with the same bolts that hold the heads, said brackets and frame being independently adjustable.

29. The combination of an electric-machine frame cast in a single piece and comprising the field-piece and end portions, end heads bolted to said end portions, and a back-gearing device consisting of the gear and driving connections with the machine, the gear-axle, brackets supporting the said back-gearing device and each having a ring portion bolted on the heads, said brackets and said frame being independently adjustable with respect to said heads.

30. The combination of an electric-machine frame, of rotatable heads secured thereto, brackets adjustable thereon and having bearings for a counter-shaft, and armature-shaft bearings rotatable on said heads and containing oil-wells.

31. The combination of an electric-machine frame, rotatably-adjustable heads thereon having bearings for the armature-shaft, a counter-shaft operatively connected with the armature-shaft, and brackets secured to the machine-frame and having bearings for the counter-shaft.

32. The combination of an electric-machine frame, rotatably-adjustable heads thereon having bearings for the armature-shaft, a counter-shaft operatively connected with the armature-shaft, brackets adjustably secured on said machine-frame and having bearings for the counter-shaft, and adjustable oiling mechanism for the counter-shaft bearings.

33. The combination of an electric-machine frame having rotatably-adjustable heads, armature-shaft bearings concentric with said heads, brackets adjustably mounted on the heads and having counter-shaft bearings, and oil-wells for said counter-shaft bearings, said wells being adjustable to compensate for the adjustment of the brackets.

NIELS ANTON CHRISTENSEN.

Witnesses:
H. W. RAMIEU,
JOHN DADMUN.